(12) United States Patent
Wang et al.

(10) Patent No.: US 6,713,530 B2
(45) Date of Patent: Mar. 30, 2004

(54) INK JET INK COMPOSITION

(75) Inventors: Jin-Shan Wang, Pittsford, NY (US); Huijuan Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 161 days.

(21) Appl. No.: 09/957,382

(22) Filed: Sep. 20, 2001

(65) Prior Publication Data

US 2003/0096885 A1 May 22, 2003

(51) Int. Cl.[7] .......................... C09D 11/10; C08L 33/02; C08L 37/00; C08L 67/00; C08L 77/00
(52) U.S. Cl. .................. 523/160; 524/548; 524/556; 524/601; 524/606; 528/272; 528/335; 528/421
(58) Field of Search ................................ 523/160, 161; 524/548, 556, 601, 606, 612; 528/272, 274, 296, 335, 336, 421

(56) References Cited

U.S. PATENT DOCUMENTS

| | | | | |
|---|---|---|---|---|
| 5,059,246 A | * | 10/1991 | Yamamoto et al. | 106/31.58 |
| 5,098,475 A | | 3/1992 | Winnik et al. | |
| 5,136,014 A | * | 8/1992 | Figuly | 528/272 |
| 5,266,106 A | | 11/1993 | Breton | |
| 5,416,145 A | * | 5/1995 | Askeland et al. | 524/190 |
| 5,587,441 A | * | 12/1996 | Frechet et al. | 526/238 |
| 5,667,572 A | * | 9/1997 | Taniguchi et al. | 106/31.36 |
| 5,889,083 A | * | 3/1999 | Zhu | 523/161 |
| 6,001,161 A | * | 12/1999 | Evans et al. | 106/31.48 |
| 6,252,025 B1 | | 6/2001 | Wang et al. | |
| 6,353,082 B1 | * | 3/2002 | Wang | 528/272 |
| 6,457,822 B1 | * | 10/2002 | Chen et al. | 347/96 |
| 6,468,338 B1 | * | 10/2002 | Evans et al. | 106/31.5 |
| 6,508,548 B2 | * | 1/2003 | Erdtmann et al. | 347/100 |
| 6,538,091 B1 | * | 3/2003 | Matyjaszewski et al. | 526/329.7 |
| 6,541,599 B1 | * | 4/2003 | Wang | 528/310 |
| 6,541,600 B1 | * | 4/2003 | Wang et al. | 528/310 |
| 2003/0069370 A1 | * | 4/2003 | Dvornic et al. | 525/474 |

FOREIGN PATENT DOCUMENTS

| | | |
|---|---|---|
| WO | 97/26294 | 6/1997 |
| WO | WO 00/37542 | 6/2000 |

OTHER PUBLICATIONS

Alger, Mark; Polymer Science Dictionary 2nd Edition, Chapman & Hall, London, 1989 (p. 407).*
Kim Y H: "Highlight Hyperbranched Polymers 10 Years After", Journal of Polymer Science, Polymer chemistry Edition, John Wiley and Sons, New York, US, vol. 36, 1998, pp. 1685–1698.

* cited by examiner

*Primary Examiner*—Callie Shosho
(74) *Attorney, Agent, or Firm*—Kathleen Neuner Manne

(57) ABSTRACT

An ink jet ink composition of water, a dye, a humectant and a hyperbranched polymer.

25 Claims, No Drawings

INK JET INK COMPOSITION

CROSS REFERENCE TO RELATED APPLICATIONS

Reference is made to commonly assigned, co-pending U.S. patent application Ser. Nos.:

Ser. No. 09/957,548 by Chen et al., filed Sep. 20, 2001, entitled "Ink Jet Printing Method";

Ser. No. 09/957,558 by Wang et al., filed Sep. 20, 2001, entitled "Ink Jet Ink Composition"; and Ser. No. 09/956,729 by Chen et al., filed Sep. 20, 2001, entitled "Ink Jet Printing Method".

FIELD OF THE INVENTION

This invention relates to an inkjet ink composition comprising a dye and a hyperbranched polymer.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various ink jet printers can be classified as either dye-based or pigment-based. A dye is a colorant which is dissolved or dispersed in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

In traditional dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness and poor smear resistance. These problems can be minimized by replacing the dyes used in ink formulations with insoluble pigments. In general, pigments are superior to dyes with respect to waterfastness, lightfastness, and stability towards pollutants in the air. However, the pigment inks tend to be unstable and settle out from the liquid vehicle over a long storage time. Pigment inks also have a tendency to clog the orifices of the printhead resulting in deterioration of print quality.

Accordingly, there is a need for inks having advantages of both dye-based inks and pigment based inks that have good lightfastness, stability towards pollutants, waterfastness and reliability in the printhead.

U.S. patent application Ser. No. 09/742,961, filed Dec. 20, 2000, discloses an inkjet printing method using an ink jet ink comprising a water soluble dye and a water dispersible polymer latex. However, there is a problem with this ink composition in that its viscosity is high, resulting in poor firability from a thermal ink jet printhead.

WO 00/37542 discloses a pigment-based ink jet ink using dendritic polymers as a dispersant. However, there is a problem with this ink in that the ink tends to be unstable and settles out from the liquid vehicle over a long storage time, and has a tendency to clog the orifices of the printhead.

Wang et. al. in pending U.S. patent application Ser. No. 09/918,584 filed Jul. 30, 2001 describes an ink jet ink composition comprising a hyperbranched polymeric dye to give improved dye stability and firability. However, there is still a need to improve the stability and firability without having to link the dye covalently through polymer synthesis.

It is an object of this invention to provide an inkjet ink composition that, when printed, provides an image which has improved waterfastness, lightfastness, and stability towards pollutants such as ozone. It is another object of this invention to provide an ink jet ink composition that has improved firability through an ink jet printhead.

SUMMARY OF THE INVENTION

These and other objects are achieved in accordance with this invention which relates to an inkjet ink composition comprising water, a humectant, a dye, and a hyperbranched polymer.

It has been found that this ink jet ink composition, when printed, provides an image which has improved waterfastness, lightfastness, and stability towards pollutants such as ozone and has improved firability through an ink jet printhead.

DETAILED DESCRIPTION OF THE INVENTION

Any hyperbranched polymer that is soluble or dispersible in an ink jet ink may be used in the invention. A dispersible hyperbranched polymer is one that can form a colloid in an inkjet ink with a particle size being less than 10 μm, preferably less than 500 nm, more preferably less than 200 nm.

Any hyperbranched polymer with various topologies and compositions may be used in the invention, e.g., homo-hyperbranched, random hyperbranched, block hyperbranched, graft hyperbranched, star hyperbranched, etc.

A hyperbranched polymer is defined as a polymer formed by polymerization of one or more branching monomers with or without no-branching monomers as described in J. Am. Chem. Soc., 74, p2718 (1952), the disclosure of which is hereby incorporated by reference. The terms "hyperbranched" used herein with respect to branched polymers are intended to designate polymers having a relatively high percentage of propagated branching sites per number of polymerized monomer units, e.g., at least one branching site per every ten monomer units, preferably at least one branching site per every five monomer units, and more preferably, at least one branching site per every two monomer units.

In general, hyperbranched polymers used in the present invention can be made through a chain polymerization or condensation polymerization processes, as described in J. Polym. Sci., Part A: Polym. Chem. 36, 1685–1698 (1998) and U.S. Pat. No. 4,857,630, the disclosures of which are hereby incorporated by reference. Specifically, the hyperbranched polymer used in the present invention can be made through the polymerization of $A_n$-$R^1$-$B_m$ monomers, wherein n and m are integers of at least 1 and $R^1$ represents a linking group between A and B or co-polymerization of $A_s$+$B_t$ co-monomer pairs wherein s and t are integers of at least 2 and of at least 3, respectively, as described in U.S. Pat. No. 4,857,630, and co-pending Wang et al U.S. patent applications Ser. Nos. 09/697,205; 09/919,096; 09/919,390; and 09/919,097, filed Jul. 30, 2001, the disclosures of each of which are hereby incorporated by reference.

In a preferred embodiment, the hyperbranched polymer used in the invention is a polyamide, polyester, polyether, vinylic polymer, polyimine, polysiloxane, polyurethane, polythioether, polyarylalkylene, polysilane, or polyesteramide.

In another preferred embodiment of the invention, the hyperbranched polymer is prepared by a chain polymerization of a monomer of the formula $M^1_n$-$R^1$-$M^2_m$ wherein (i) $R^1$ is a substituted or non-substituted straight, cyclic or branched alkyl, alkenyl, or aryl moiety and hetero atom containing substituted or non-substituted straight, cyclic or branched alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1, more preferably n is 1 and m is 1 or 2, most preferably n is 1 and m is 1.

In another preferred embodiment of the invention, the hyperbranched polymer is prepared by a condensation or addition polymerization of a monomer of the formula $M^3_s$-$R^1$-$M^4_t$ wherein (i) $R^1$ is defined above; (ii), $M^3$ and $M^4$ are groups that undergo a condensation or addition reaction with or without a catalyst; and (iii), s is an integer of at least 1 and t at least 2, more preferably s is 1 and t is 2 to 4, and most preferably s is 1 and t is 2.

In another preferred embodiment of the invention, hyperbranched polymer is prepared by a condensation or addition polymerization of a comonomer pair of the formula $R^2$-$M^5_x$ and $R^3$-$M^6_y$ wherein (i) $R^2$ and $R^3$ are each dependently substituted or non-substituted straight, cyclic or branched alkyl, alkenyl, or aryl moiety or hetero atom containing substituted or non-substituted straight, cyclic or branched alkyl, alkenyl, or aryl moiety; (ii), $M^5$ and $M^6$ are groups that undergo a condensation or addition reaction; and (iii), x is an integer of at least 2 and y an integer of at least 3, more preferably x is 2 and 4 and y is 3 to 10, and most preferably x is 2 and y is 3.

In another preferred embodiment of the invention,
$M^1$ is a non-substituted or substituted vinylic group or epoxy; and
$M^2$ is X, —$CH_2X$, —$CH(CH_3)X$, —$C(O)CH_2X$, —$C(O)CHX_2$, —$C(O)CX_3$, —$OC(O)CH_2X$, —$OC(O)CHX_2$, or —$OC(O)CX_3$
wherein:
  X is Cl, Br, I, S—C(=S)—$NR^4R^5$, S—C(=S)—$OR^4$, —O—$NR^4R^5$, OH or

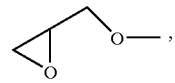

wherein $R^4$ and $R^5$ are each independently —$(CH_2)_r$, —$C_6H_5$, —C(O)O or —C(O);

$R^7$, $R^8$ and $R^9$ are each independently a linear or branched alkyl or aromatic group; and
r=1–12.

In another preferred embodiment of the invention, $M^3$ and $M^4$ are each independently —COOH, —OH, —C(O)Cl,

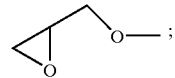

anhydride, NH, or $NH_2$.

In another preferred embodiment of the invention, $M^5$ and $M^6$ are each independently —COOH, —OH, —C(O)Cl, epoxy, anhydride, —NH, —$NH_2$ or

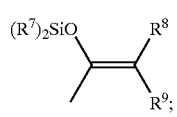

$R^2$ is —$C_6H_3$— or —$(CH_2)_q$—$C(R^6)$—,
  wherein $R^6$ is a linear or branched alkyl or aromatic group and q is 1–6; and
$R^3$ is —$C_6H_4$—, —$C_6H_4$—O—$C_6H_4$—, —$C_6H_3$, —$N(CH_2)_3$, —$C_4H_8$—, —$C_6H_{10}$—,

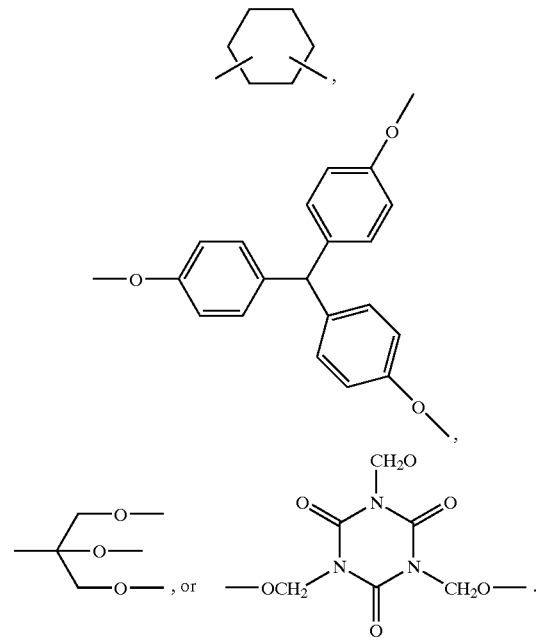

In still another embodiment of the invention, $R^1$, $R^2$, and $R^3$ are each independently an oligomeric or polymeric chain of a polyamide, polyester, polyether, vinylic polymer, polyimine, polysiloxane, polyurethane, polythioether, polyarylalkylene, polysilane, or polyesteramide.

Examples of $M^1$-$R^1$-$M^2_m$ include:

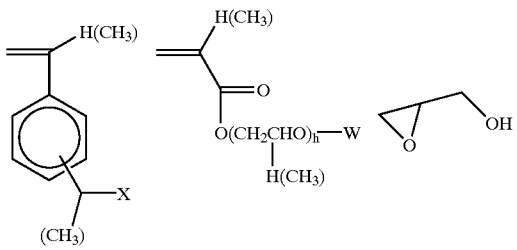

wherein h is an integer of at least 1;

W is —C(O)CH$_2$X, —C(O)CHX$_2$ or —C(O)CX$_3$; and

X is Cl, Br, I,

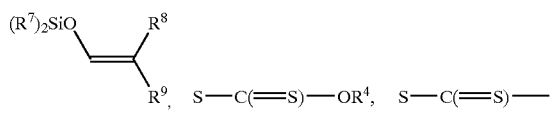

NR$^4$R$^5$ or O-NR$^4$R$^5$, where R$^4$ and R$^5$ are defined as above, and R$^7$, R$^8$ and R$^9$ are each independently a linear or branched alkyl or aromatic group.

Examples of $M^3_s$-$R^2$-$M^4_t$ include 2,2-bis(hydroxymethyl) propionic acid, 2,3-diaminoproponic acid, 2,5-diaminopentanoic acid, 1-Lysine and other ones having the following structure:

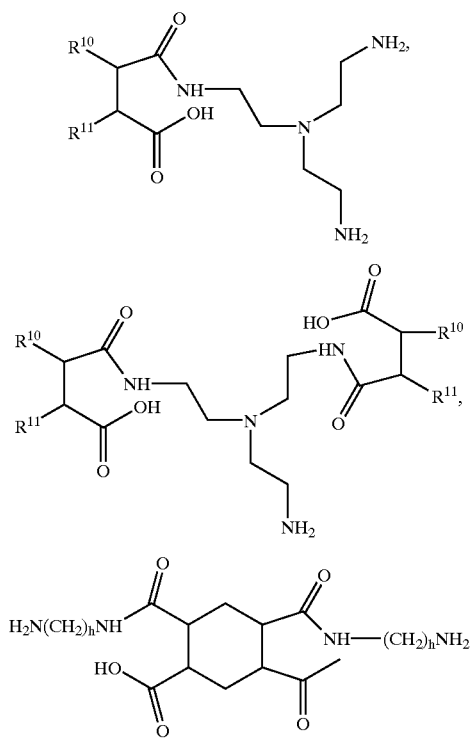

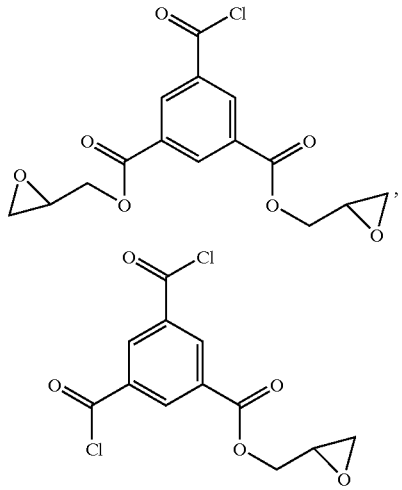

wherein R$^{10}$ and R$^{11}$ are independently H, substituted or non-substituted straight or branched alkyl, alkenyl, aryl moiety and may be joined to form an alkylene group, 3 to 8-membered ring, h is defined above.

Examples of R$^2$-$M^5_x$ and R$^3$-$M^6_y$ include JEFFAMINE®, diaminohexane, 3,3'-diamino-N-methylpropylamine, 1,4-phenylenediamine, 4,4'-oxydianiline, succinic acid, adipic acid, 1,4-cyclohexanedicarboxilic acid, terephthalic acid, 4,4'-oxybis(benzoic acid), 2-aminoterephtalic acid, tris(2-aminoethyl)amine, trimesic acid, maleic anhydride, succinic anhydride, hexahydrophthalic anhydride, phthalic anhydride, glutaric anhydride, octenyl anhydride, decanyl anhydride, 2-dodecenyl-1-yl-succinic anhydride, octen-1-ylsuccinic anhydride, 1,2,3,4-cyclopentane-tetra-carboxylic dianhydride, diethanolamine, diisopropanolamine, 1,2,7,8-diepoxyoctane, 1,1,1-tris(hydroxylmethyl)ethane, triethanolamine, diglycidyl-1,2-cyclohexanedicaboxylate, diglycidyl-1,2,3,6-tetrahydrophtalate, poly(propyleneglycol) diglycidyl ether, poly(dimethylsioxane) diglycidyl ether, bisphenol A propoxylate (lPO/phenol) diglycidyl ether, bis(4-glycidyloxyphenyl)methane, resorcinol diglycidyl ether, diglycidyl aniline, triphenylolmethane tri-diglycidyl ether, trimethylolpropane tridiglycidyl ether, N,N-diglycidyl-4-glycidyloxybenzene, tris-2(2,3-epoxypropyl)isocyanurate, terephthaloyl chloride, 1,3,5-benzenetricarbonyl trichloride, aminopropyl terminated polydimethylsiloxanes with molecular weight from 800 to 300,000, and aminopropyl methylsiloxane-dimethylsiloxane copolymers with molecular weight from 4,000 to 5,000 and molar percentage of aminopropyl methylsiloxane from 2 to 7.

In a preferred embodiment of the invention, the soluble or dispersible hyperbranched polymer possesses water soluble or dispersible segment groups either at the ends thereof or in the backbone. These water soluble or dispersible segments or groups can be introduced by either direct polymerization or by post-modification of the hyperbranched polymer.

In another preferred embodiment of the invention, the water soluble or water dispersible segment or groups are cationic, anionic, and non-charged.

In another preferred embodiment of the invention, the anionic segments or groups are carboxylic acids and their salts, sulfonic acid and their salts, or phosphonic acid and their salts.

In another preferred embodiment of the invention, the cationic segments or groups are N and P containing quaternized onium salts.

In another preferred embodiment of the invention, the non-charged segments or groups are—OH, polyether, substituted or non-substitute amines.

The dyes used in this invention can be either water-soluble or water insoluble. Examples of a water soluble dye includes a reactive dye, direct dye, anionic dye, acid dye, basic dye, mono- or poly-azo dye, phthalocyanine dye, methine or polymethine dye, merocyanine dye, azamethine dye, azine dye, quinophthalone dye, thiazine dye, oxazine dye, anthraquinone or a metal-complex dye, or dyes as disclosed in U.S. Pat. No. 5,973,026, the disclosure of which is hereby incorporated by reference. In a preferred embodiment of the invention the water-soluble dye may be a cationic or an anionic dye.

In a preferred embodiment of the invention, cationic dyes are used such as azo dyes, e.g., quaternized pyrazoleazoaniline dyes as disclosed in U.S. patent application Ser. No. 09/643,281, filed Aug. 22, 2000; triarylmethine dyes; azine dyes; phthalocyanine dyes; oxazine dyes or thiazine dyes.

In another preferred embodiment of the invention, anionic dyes which may be used include a mono or poly azo dye, such as a pyrazoleazoindole dye as disclosed in U.S. patent application Ser. No. 09/689,184 filed Oct. 12, 2000; a metal-complex dyes, such as transition metal complexes as disclosed in U.S. Pat. Nos. 5,997,622 and 6,001,161, i.e., a transition metal complex of an 8-heterocyclylazo-5-hydroxyquinoline; phthalocyanine dyes such as C.I. Direct Blue 199; anthraquinone dyes, or anthtapyridone dyes.

The water insoluble dyes used in this invention can be any dyes that are insoluble but dispersible in water as disclosed in U.S. patent application Ser. No. 09/510,879, filed Feb. 23, 2000.

In another preferred embodiment of the invention, the water insoluble dyes can be salt-type dyes as disclosed in U.S. patent application Ser. No. 09/709,078, filed Nov. 10, 2000.

The dye used in the ink jet ink of the invention is present in any effective amount, generally from about 0.1 to about 10% by weight, and preferably from about 0.5% to about 6% by weight.

The hyperbranched polymer used in the invention is present in the ink jet ink generally from about 0.1% to about 30% by weight, and preferably from about 0.5% to about 10% by weight.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the ink composition of the invention to suppress the growth of microorganisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

Additional additives which may optionally be present in the inkjet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLES

The following dyes were used in the examples of the present invention:

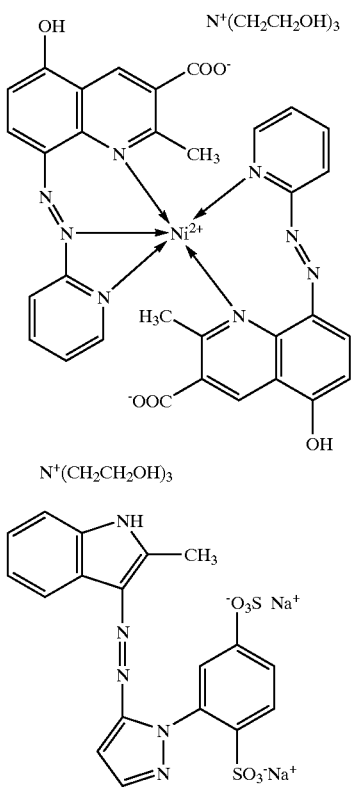

Dye-3

Dye-4

The following hyperbranched polymers were used in the examples of the present invention:

Hyperbranched Polymer (HB-1)

To a three-neck round flask equipped with a stirring bar and water condenser, 117 g (0.6838 mol) of 1,4-cyclohexanedicarboxylic acid, 100 g (0.6838 mol) of tris(2-aminoethyl)amine, and 440 ml of deionized water were added. The solution was heated at 60° C. for three hours. The salt solution obtained was concentrated to contain ca. 65 wt. % solid (35 wt. % water) and then added to a 1 liter stainless steel autoclave. Polymerization was carried out at 235° C. and ca. $3.3 \times 10^3$ kPa for 3 hours. The polymer was precipitated twice from cold acetone and dried at room temperature under vacuum for 24 hours. The glass transition temperature of the polymer (Tg) is ca. 130° C.

Hyperbranched Polymer (HB-2)

HB-2 is a hyperbranched polyesteramide obtained from DSM Corp. with a molecular weight about 1200.

Hyperbranched Polymer (HB-3)

The synthesis employed was the same as in HB-1, except for using succinic acid instead of 1,4-cyclohexanedicarboxylic acid as the $B_2$ monomer. The Tg of the polymer is 54° C.

Hyperbranched Polymer (HB-4):

A mixture of 2.30 g of HB-1 and 5.0 g of succinic anhydride in 30 ml of methylsulfoxide was stirred at room temperature for 4 hours. The final polymer was precipitated from acetone and dried under vacuum overnight. Both NMR and MS spectra confirmed a complete transformation of —$NH_2$ groups to —NH—C(O)—units.

Hyperbranched Polymer (HB-5)

The process of synthesis of HB-1 was repeated, except for changing the molar ratio of $NH_2$/COOH of reactants from 3/2 to 3/1. The Tg of the polymer is ca. 65° C.

Comparative Ink C-1 (No polymer)

To prepare a comparative ink jet ink, 3.00 g of Dye 1 (10% active), 0.05 g Surfynol® 465 (Air Products Inc.), 0.6 g diethylene glycol and 0.3 g di(propyleneglycol) methyl ether (Dowanol(® DPM) were added together with distilled water so that the final ink weight was 10.0 g. The final ink contained 3.0% dye, 0.50% Surfynol® 465, 6.0% diethylene glycol and 3% di(propyleneglycol) methyl ether. The solution was filtered through a 3 μm polytetrafluoroethylene filter and filled into an empty Lexmark Z51 ink jet cartridge.

Comparative Ink C-2 (No polymer)

This ink was prepared similar to Comparative Ink 1 except that 3.0 g of Dye 2 (15% active) was used instead of Dye 1.

Comparative Ink C-3 (No polymer)

This ink was prepared similar to Comparative Ink 1 except that 2.20 g of Dye 3 (10% active) was used instead of Dye 1.

Comparative Ink C-4 (No polymer)

This ink was prepared similar to Comparative Ink 1 except that 3.75 g of Dye 4 (10% active) was used instead of Dye 1.

Ink 1 of the Invention

This ink was prepared similar to Comparative Ink 1 except that the hyperbranched polymer (HB-1) was also used in addition to Dye 1. To prepare this ink, 0.25 g of HB-1, 3.00 g of Dye 1 (10% active), 0.05 g Surfynol®465 (Air Products Inc.), 0.6 g diethylene glycol and 0.3 g di(propyleneglycol) methyl ether (Dowanol® DPM) were added together with distilled water so that the final ink weight was 10.0 g. The final ink contained 2.5% HB-1, 3.0% dye, 0.50% Surfynol® 465, 6.0% diethylene glycol and 3% di(propyleneglycol) methyl ether.

The solution was filtered through a 3 μm polytetrafluoroethylene filter and filled into an LexmarkZ51 ink jet cartridge.

Ink 2 of the Invention

This ink was prepared similar to Ink 1 except that the hyperbranched polymer (HB-2) was used instead of the hyperbranched polymer (HB-1).

Ink 3 of the Invention

This ink was prepared similar to Ink 1 except that the hyperbranched polymer (HB-3) was used instead of the hyperbranched polymer (HB-1).

Ink 4 of the Invention

This ink was prepared similar to Ink 1 except that the hyperbranched polymer (HB4) was used instead of the hyperbranched polymer (HB-1).

Ink 5 of the Invention

This ink was prepared similar to Ink 1 except that the hyperbranched polymer (HB-5) was used instead of the hyperbranched polymer (HB-1).

Ink 6 of the Invention

This ink was prepared similar to Ink 1 except that 3.0 g of Dye 2 (15% active) was used instead of Dye 1.

Ink 7 of the Invention

This ink was prepared similar to Ink 1 except that 2.2 g of Dye 3 (10% active) was used instead of Dye 1.

Ink 8 of the Invention

This ink was prepared similar to Ink 1 except that 3.75 g of Dye 4 (10% active) was used instead of Dye 1.

Printing

Elements were prepared using test images consisting of a series of 6 variable density patches, approximately 15 by 13 mm in size, ranging from 5% dot coverage to 100% dot coverage printed onto commercially available Epson Premium Glossy Paper, Cat. No SO41286, with a Lexmark Z51 Thermal ink jet printer, using the above inks. The elements were allowed to dry for 24 hours at ambient temperature and humidity.

Stability Tests

The above elements were then placed in an ozone chamber (~5 ppm ozone level, 50% relative humidity) for 6 hours. The Status A reflection densities of the maximum density patch of the elements were measured using an X-Rite®414 densitometer before and after the ozone fade test. The percentages of the Status A densities retained for the 100% dot coverage patches were calculated and are listed in Table 1.

TABLE 1

| Element Containing Example Ink | Ozone Test (% Retained) |
| --- | --- |
| C-1 | 75 |
| 1 | 95 |
| 2 | 85 |
| 3 | 89 |
| 4 | 89 |
| 5 | 91 |
| C-2 | 75 |
| 6 | 81 |
| C-3 | 26 |
| 7 | 35 |
| C-4 | 76 |
| 8 | 87 |

The above results show that the elements of the invention had improved ozone stability as compared to the control elements.

The invention has been described in detail with particular reference to certain preferred embodiments thereof, but it will be understood that variations and modifications can be effected within the spirit and scope of the invention.

What is claimed is:

1. An ink jet ink composition comprising water, a dye, a humectant, and a hyperbranched polymer, wherein the dye and the hyperbranched polymer are separate compounds.

2. The composition of claim 1 wherein said hyperbranched polymer is water-soluble or water-dispersible.

3. The composition of claim 1 wherein said hyperbranched polymer is a polyamide, polyester, polyether, vinylic polymer, polyimine, polysiloxane, polyurethane, polythioether, polyarylalkylene, polysilane, or polyesteramide.

4. The composition of claim 1 wherein said hyperbranched polymer is prepared by a chain polymerization of a monomer of the formula $M^1_n$-$R^1$-$M^2_m$ wherein (i) $R^1$ is a substituted or non-substituted straight, cyclic or branched alkyl, alkenyl, or aryl moiety and hetero atom containing substituted or non-substituted straight, cyclic or branched alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1.

5. The composition of claim 4 wherein:
   $M^1$ is a non-substituted or substituted vinylic group or epoxy; and
   $M^2$ is X, —$CH_2X$, —$CH(CH_3)X$, —$C(O)CH_2X$, —$C(O)CHX_2$, —$C(O)CX_3$, —$OC(O)CH_2X$, —$OC(O)CHX_2$, or —$OC(O)CX_3$ wherein:
   X is Cl, Br, I, S—C(=S)—$NR^4R^5$, S—C(=S)—$OR^4$, —O—$NR^4R^5$, OH or

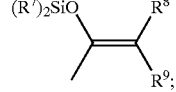

wherein $R^4$ and $R^5$ are each independently —$(CH_2)_r$, —$C_6H_5$, —C(O)O or —C(O);
$R^7$, $R^8$ and $R^9$ are each independently a linear or branched alkyl or aromatic group; and
r=1–12.

6. The composition of claim 4 wherein $R^1$ is an oligomeric or polymeric chain of a polyamide, polyester, polyether, vinylic polymer, polyimine, polysiloxane, polyurethane, polythioether, polyarylalkylene, polysilane, or polyesteramide.

7. The composition of claim 4 wherein said $M^1_n$-$R^1$-$M^2_m$ is:

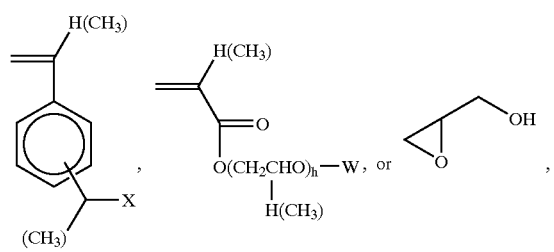

wherein h is an integer of at least 1;
W is —$C(O)CH_2X$, —$C(O)CHX_2$ or —$C(O)CX_3$; and
X is Cl, Br, I,

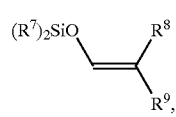

S—C(=S)—$OR^4$, S—C(=S)—$NR^4R^5$ or O—$NR^4R^5$, where $R^4$ and $R^5$ are each independently —$(CH_2)_r$, —$C_6H_5$, —C(O)O or —C(O), and $R^7$, $R^8$ and $R^9$ are each independently a linear or branched alkyl or aromatic group.

8. The composition of claim 1 wherein said hyperbranched polymer is prepared by a condensation or addition polymerization of a monomer of the formula $M^3{}_s\text{-}R^1\text{-}M^4{}_t$ wherein (i) $R^1$ is defined as a substituted or non-substituted straight, cyclic or branched alkyl, alkenyl, or aryl moiety and hetero atom containing substituted or non-substituted straight, cyclic or branched alkyl, alkenyl, or aryl moiety; (ii), $M^3$ and $M^4$ are groups that undergo a condensation or addition reaction with or without a catalyst; and (iii), s is an integer of at least 1 and t is an integer of at least 2.

9. The composition of claim 8 wherein $M^3$ and $M^4$ are each independently —COOH, —OH, —C(O)Cl,

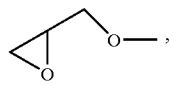

anhydride, —NH, or —NH$_2$.

10. The composition of claim 8 wherein said $M^3{}_s\text{-}R^1\text{-}M^4{}_t$ is 2,2-bis(hydroxymethyl)propionic acid, 2,3-diaminoproponic acid, 2,5-diaminopentanoic acid, 1-Lysine or has one of the following structures:

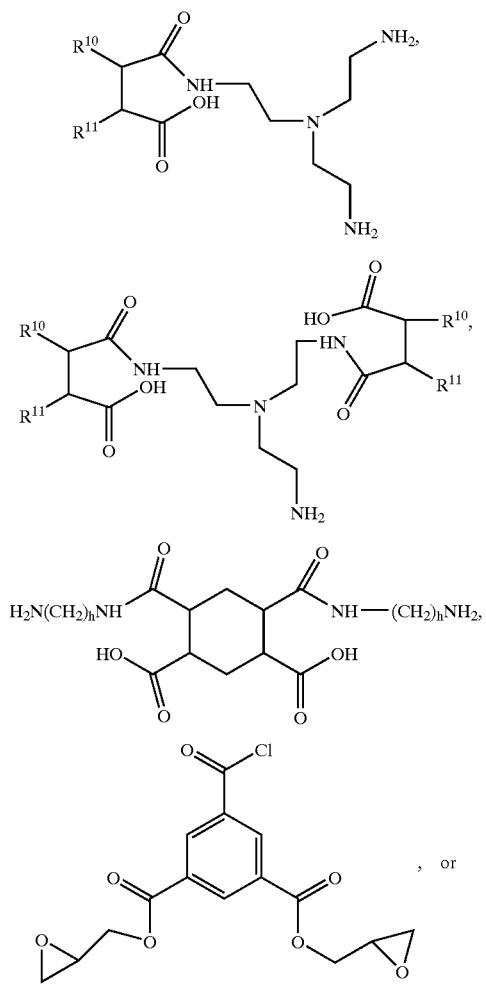

wherein $R^{10}$ and $R^{11}$ are independently H, substituted or non-substituted straight or branched alkyl, alkenyl, aryl moiety and may be joined to form an alkylene group, 3 to 8-membered ring; and h is an integer of at least 1.

11. The composition of claim 1 wherein said hyperbranched polymer is prepared by a condensation or addition polymerization of a co-monomer pair of the formula $R^2\text{-}M^5{}_x$ and $R^3\text{-}M^6{}_y$ wherein (i) $R^2$ and $R^3$ are each dependently substituted or non-substituted straight, cyclic or branched alkyl, alkenyl, or aryl moiety or hetero atom containing substituted or non-substituted straight, cyclic or branched alkyl, alkenyl, or aryl moiety; (ii), $M^5$ and $M^6$ are groups that undergo a condensation or addition reaction; and (iii), x is an integer of at least 2 and y is an integer of at least 3.

12. The composition of claim 11 wherein $M^5$ and $M^6$ are each independently —COOH, —OH, —C(O)Cl, epoxy, anhydride, —NH, —NH$_2$ or

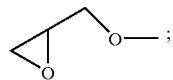

$R^2$ is —C$_6$H$_3$— or —(CH$_2$)$_q$—C(R$^6$)—,
wherein $R^6$ is a linear or branched alkyl or aromatic group and q is 1–6; and
$R^3$ is —C$_6$H$_4$—, —C$_6$H$_4$—O—C$_6$H$_4$—, —C$_6$H$_3$, —N(CH$_2$)$_3$, —C$_4$H$_8$—, —C$_6$H$_{10}$—,

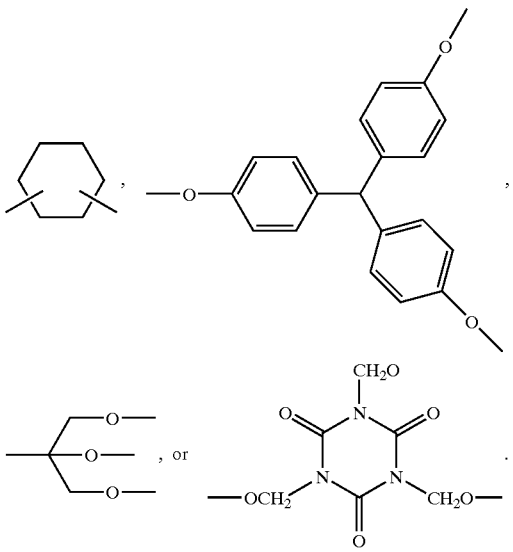

13. The composition of claim 11 wherein $R^2$, and $R^3$ are each independently an oligomeric or polymeric chain of a polyamide, polyester, polyether, vinylic polymer, polyimine, polysiloxane, polyurethane, polythioether, polyarylalkylene, polysilane, or polyesteramide.

14. The composition of claim 11 wherein said $R^2$-$M^5_x$ and $R^3$-$M^6_y$ are each independently a polyoxyalkyleneamine, diaminohexane, 3,3'-diamino-N-methylpropylamine, 1,4-phenylenediamine, 4,4'-oxydianiline, succinic acid, adipic acid, 1,4-cyclohexanedicarboxilic acid, terephthalic acid, 4,4'-oxybis(benzoic acid), 2-aminoterephtalic acid, tris(2-aminoethyl)amine, trimesic acid, maleic anhydride, succinic anhydride, hexahydrophthalic anhydride, phthalic anhydride, glutaric anhydride, octenyl anhydride, decanyl anhydride, 2-dodecenyl-1-ylsuccinic anhydride, octen-1-ylsuccinic anhydride, 1,2,3,4-cyclopentane-tetra-carboxylic dianhydride, diethanolamine, diisopropanolamine, 1,2,7,8-diepoxyoctane, 1,1,1-tris(hydroxylmethyl)ethane, triethanolamine, diglycidyl-1,2-cyclohexanedicaboxylate, diglycidyl-1,2,3,6-tetrahydrophtalate, poly(propyleneglycol) diglycidyl ether, poly(dimethylsioxane) diglycidyl ether, bisphenol A propoxylate (IPO/phenol) diglycidyl ether, bis(4-glycidyloxyphenyl)methane, resorcinol diglycidyl ether, diglycidyl aniline, triphenylolmethane tri-diglycidyl ether, trimethylolpropane tridiglycidyl ether, N,N-diglycidyl-4-glycidyloxybenzene tris-2(2,3-epoxypropyl)isocyanurate, terephthaloyl chloride, 1,3,5-benzenetricarbonyl trichloride, aminopropyl terminated polydimethylsiloxane, or aminopropyl methylsiloxane-dimethylsiloxane copolymer.

15. The composition of claim 1 wherein said hyperbranched polymer possesses water soluble or dispersible segment or groups either at the ends thereof or in the backbone.

16. The composition of claim 15 wherein said water soluble or water dispersible segment or groups are cationic, anionic, and non-charged.

17. The composition of claim 16 wherein said anionic segments or groups are carboxylic acids and their salts, sulfonic acid and their salts, or phosphonic acid and their salts.

18. The composition of claim 16 wherein said cationic segments or groups are N and P containing quaternized onium salts.

19. The composition of claim 16 wherein said non-charged segments or groups are —OH, polyether, substituted or non-substitute amines.

20. The composition of claim 1 wherein said dye is a water soluble dye.

21. The composition of claim 20 wherein said water soluble dye is a reactive dye, direct dye, anionic dye, acid dye, basic dye, mono- or poly-azo dye, phthalocyanine dye, methine or polymethine dye, merocyanine dye, azamethine dye, azine dye, quinophthalone dye, thiazine dye, oxazine dye, anthraquinone or metal-complex dye.

22. The composition of claim 21 wherein said mono- or poly-azo dye is a pyrazoleazoindole.

23. The composition of claim 21 wherein said metal-complex dye is a transition metal complex of an 8-heterocyclylazo-5-hydroxyquinoline.

24. The composition of claim 1 wherein said humectant is diethylene glycol, glycerol, diethylene glycol monobutylether or dipropyleneglycol methyl ether.

25. The composition of claim 1 wherein said hyperbranched polymer comprises about 0.1 to about 30% by weight of said ink jet ink composition.

* * * * *

UNITED STATES PATENT AND TRADEMARK OFFICE
CERTIFICATE OF CORRECTION

PATENT NO.   : 6,713,530 B2
DATED        : March 30, 2004
INVENTOR(S)  : Jin-Shan Wang et al.

It is certified that error appears in the above-identified patent and that said Letters Patent is hereby corrected as shown below:

Column 5,
Line 2, please delete 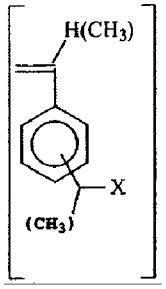 and in place thereof, insert: 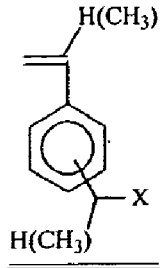

Column 12,
Line 40, please delete 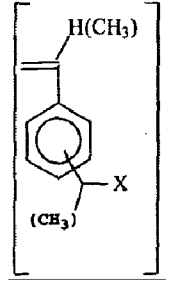 and in place thereof, insert: 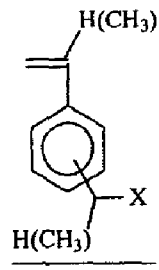

Signed and Sealed this

Eighth Day of March, 2005

JON W. DUDAS
*Director of the United States Patent and Trademark Office*